Patented May 10, 1932

1,857,244

UNITED STATES PATENT OFFICE

WINFRID HENTRICH, OF ERLANGEN, KARL BURR AND HUGO SCHWEITZER, OF LEVERKUSEN-WIESDORF, GERMANY, ASSIGNORS TO GENERAL ANILINE WORKS, INC., OF NEW YORK, N. Y., A CORPORATION OF DELAWARE

NEW MONOAZODYESTUFFS

No Drawing. Application filed May 28, 1931, Serial No. 540,812, and in Germany June 7, 1930.

The present invention relates to new monoazodyestuffs, more particularly it relates to dyestuffs which may be represented by the general formula:

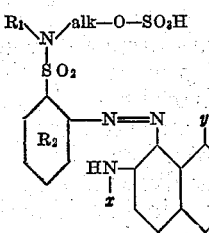

wherein $R_1$ stands for a benzene nucleus which may be substituted by halogen, alkyl or alkoxy, "alk" stands for an alkylene group, $x$ stands for hydrogen, alkyl or phenyl, $y$ stands for hydrogen or a hydroxy group, $z$ stands for a sulfonic acid group or a carboxylic acid group, but $y$ and $z$ not simultaneously representing a hydroxy group and a carboxylic acid group, and wherein the benzene nucleus $R_2$ may be substituted by halogen, alkyl, alkoxy, the nitro group, the amino group and the acylamino group.

Our new dyestuffs are obtainable by diazotizing in the usual manner an amine of the general formula:

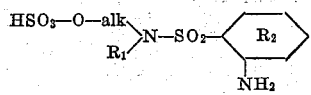

wherein the figures mean the same as stated above, and coupling in an acid medium with a coupling component of the general formula:

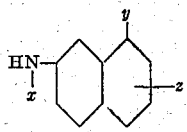

wherein $x$, $y$ and $z$ are to be defined as in the first general formula.

Amines of the type referred to above coming into consideration as diazotization components for the purpose of our invention are for example:

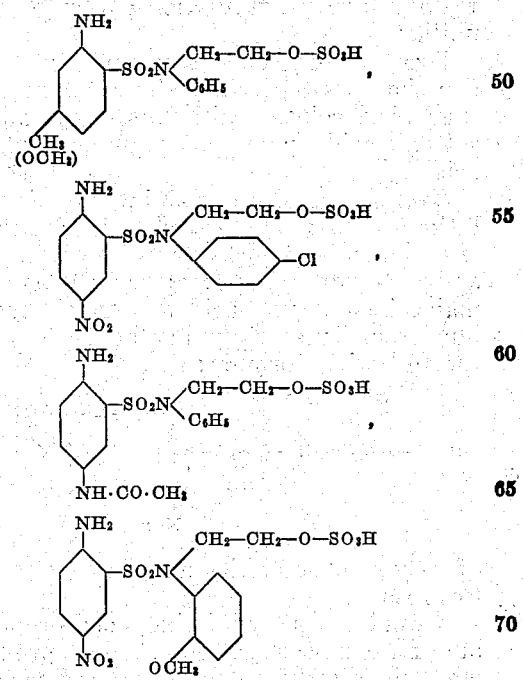

The said compounds can be obtained by causing the corresponding 1-aminobenzene-2-sulfoxalkylarylides to react with sulfuric acid (for example of 60 or 66° Bé.) at ordinary or moderately elevated temperature. They can be isolated as well crystallized sodium salts and diazotized in the customary manner in aqueous solution, whereby readily crystallizing, stable diazo compounds are produced. When the diazotization of the amino aryl sulfoxalkyl arylides is carried out in sulfonic acid of the above concentration by means of nitrosyl sulfuric acid an esterification of the aliphatic hydroxyl group proceeds simultaneously with the diazotization.

Our new dyestuffs are in form of their alkali metal salts generally bluish-red to bluish-black powders, soluble in water and dyeing wool from an acid bath bluish-red to blue shades of good fastness properties.

The invention is illustrated by the following examples, without being limited thereto:

*Example 1.*—43.9 parts by weight of 4-nitro-1-amino-benzene-2-sulfanilide - N - oxethyl sulfuric acid ester (sodium salt) are diazotized in aqueous solution and the diazo solution is combined with a solution of 23.7 parts by weight of 2-methylamino-naphthalene-7-sulfonic acid maintained weakly acid to Congo. The resulting dyestuff having in its free state the following formula:

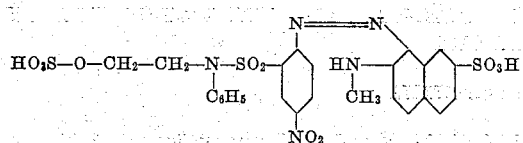

dyes wool from an acid bath in clear reddish-blue shades and possess besides other satisfactory fastness properties a very good solubility.

Dyestuffs of similar properties but of redder shades are obtained by combining the same diazo solution with 2-naphthylamine-6-sulfonic acid, or 2-naphthylamine-7-sulfonic acid.

*Example 2.*—By combining the diazo solution of the amine described in Example 1 with a solution of 23.9 parts by weight of 2-amino-8-hydroxynaphthalene-6-sulfonic acid maintained weakly acid to Congo a marine blue wool dyestuff having in its free state the following formula:

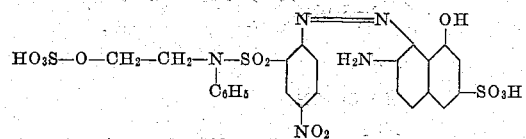

of very good solubility and fastness properties results.

A wool dyestuff of similar good properties but of a somewhat greener shade is produced when the diazo compound of the same amine isolated by salting out and filtering is combined in an acid medium with 25.3 parts by weight of 2-methylamino-8-hydroxynaphthalene-6-sulfonic acid. A bluish green dyestuff is obtained by replacing 4-nitro-1-aminobenzene - 2 - sulfanilide-N-oxethylsulfuric acid ester by the 4-nitro-1-aminobenzene-2-sulfo - 2' - anisidide-N-oxethyl sulfuric acid ester, while the corresponding 2'- and 4'-toluidide- or chloroanilide sulfuric acid esters yield quite similar shades to the anilide sulfuric acid ester. By coupling the sulfuric acid ester of 4-nitro-1-aminobenzene-2-sulfoxalkyl arylides with 2-methylaminonaphthalene-7-sulfonic acid, acid dyestuffs are obtained which dye animal fibres in fast marine blue shades and which possess very good solubility.

The diazo compounds of 4-nitro-1-aminobenzene-2-sulfanilide-N-oxethylsulfuric acid ester and analogous sulfuric acid esters can be directly obtained by starting instead of from the already produced 4-nitro-1-aminobenzene-2-sulfanilide-N-oxethylsulfuric acid ester from 4-nitro-1-aminobenzene-2-sulfoxethyl anilide, dissolving the same in strong sulfuric acid (60° Bé. or even more highly concentrated) and diazotizing with nitrosyl sulfuric acid. By coupling with the above mentioned components the same dyestuffs are obtained as according to the method given in Example 1.

The 2'-anisidide, 2'-toluidide, 4'-toluidide, 2-chloroanilide, and 4'-chloroanilide of 4-nitro-1-aminobenzene-2-sulfonic acid substituted by oxethyl in the SO$_2$NH-group are prepared by the action of 4-nitro-1-chlorobenzene-2-sulfochloride on oxethyl-o-anisidine, oxethyl-o-toluidine, oxethyl-p-toluidine, oxethyl-o-chloroaniline, oxethyl-p-chloroaniline and replacing the chlorine in the 1-position by an amino group by means of ammonia under pressure. The substituted oxethylanilides are prepared from the corresponding primary amines by the action of glycol-chlorohydrine by heating in water and in the presence of an acid binding agent.

*Example 3.*—65.6 parts by weight of the sodium salt of the dyestuff of Example 2 obtained by coupling in an acid medium diazotized 4-nitro-1-aminobenzene-2-sulfanilide-N-oxethylsulfuric acid ester with 2-amino-8-hydroxynaphthalene-6-sulfonic acid are dissolved in 500 parts by weight of water at a temperature of about 70° C. To the solution there are added 85 parts by weight of an aqueous sodium sulfide solution (one liter containing 1000 g. of crystallized sodium sulfide), the solution is kept at this temperature for a short time, boiled up, purified by filtering and the dyestuff is salted out by means of common salt. In its free state the dyestuff has the following formula:

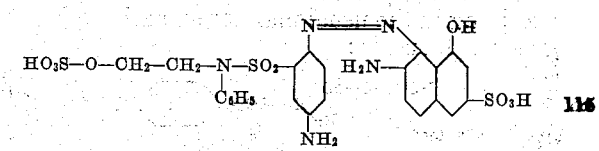

In quite an analogous manner the dyestuffs further mentioned in Example 2 may be reduced.

By acetylating the amino group in the benzene nucleus dyestuffs are obtained from these compounds some of which exhibit still better properties, the shade being displaced further towards red.

The same dyestuffs are produced by combining in an acid medium the diazo solution from 4-acetylamino-1-aminobenzene-2-sulfarylide-N-oxethyl sulfuric acid ester with 2-amino-8-hydroxynaphthalene-6-sulfonic acid or 2-methylamino-8-hydroxynaphthalene-6-sulfonic acid. Furthermore dyestuffs of identical fastness properties and very good solubility are obtained by combining the same diazo compound with 2-methylamino-naphthalene-7-sulfonic acid, 2-naphthylamine-6-sulfonic acid or 2-naphthylamine-7-sulfonic acid.

We claim:

1. As new products azodyestuffs of the probable general formula:

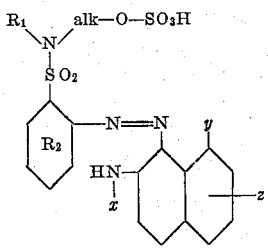

wherein $R_1$ stands for a benzene nucleus which may be substituted by halogen, alkyl or alkoxy, "alk" stands for an alkylene group, $x$ stands for hydrogen, alkyl or phenyl, $y$ stands for hydrogen or a hydroxy group, $z$ stands for a sulfonic acid group or a carboxylic acid group, but $y$ and $z$ not simultaneously representing a hydroxy group and a carboxylic acid group, and wherein the benzene nucleus $R_2$ may be substituted by halogen, alkyl, alkoxy, the nitro group, the amino group and the acylamino group, being in the form of their alkali metal salts generally bluish-red to bluish-black powders, soluble in water and dyeing wool from an acid bath bluish-red to blue shades of good fastness properties.

2. As new products azodyestuffs of the probable general formula:

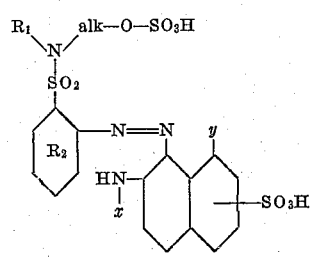

wherein $R_1$ stands for a benzene nucleus which may be substituted by halogen, alkyl or alkoxy, "alk" stands for an alkylene group, $x$ stands for hydrogen, methyl or ethyl, $y$ stands for hydrogen or a hydroxy group, and wherein the benzene nucleus $R_2$ may be substituted by halogen, alkyl, alkoxy, the nitro group, the amino group and the acylamino group, being in the form of their alkali metal salts generally bluish-red to bluish-black powders, soluble in water and dyeing wool from an acid bath bluish-red to blue shades of good fastness properties.

3. As new products azodyestuffs of the probable general formula:

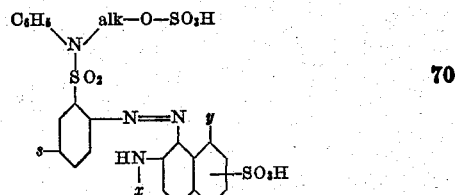

wherein "alk" stands for an alkylene group containing two carbon atoms, $s$ stands for a nitro, amino or acylamino group, $x$ stands for hydrogen, methyl or ethyl, $y$ stands for hydrogen or a hydroxy group, being in the form of their alkali metal salts generally bluish-red to bluish-black powders, soluble in water and dyeing wool from an acid bath bluish-red to blue shades of good fastness properties.

4. As a new product the azodyestuff of the following formula:

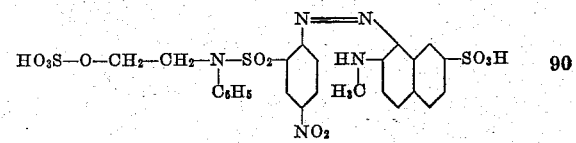

dyeing wool from an acid bath in clear reddish-blue shades of good fastness properties.

5. As a new product the azodyestuff of the following formula:

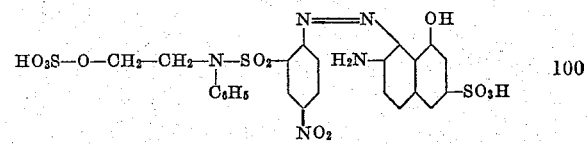

dyeing wool from an acid bath marine blue shades of good fastness properties.

6. As a new product the azodyestuff of the following formula:

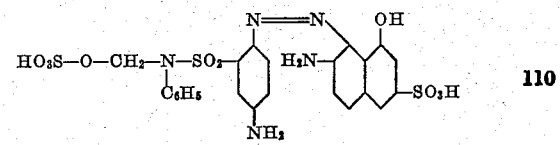

dyeing wool from an acid bath reddish-blue shades of good fastness properties.

In testimony whereof, we affix our signatures.

WINFRID HENTRICH.
KARL BURR.
HUGO SCHWEITZER.